(12) United States Patent
Lázaro Villa et al.

(10) Patent No.: US 7,200,630 B2
(45) Date of Patent: Apr. 3, 2007

(54) INVERSE FOURIER TRANSFORM METHOD, PHASE CHARACTERIZATION METHOD OF OPTICAL COMPONENTS FROM TRANSMISSION AND GROUP DELAY MEASUREMENTS AS WELL AS A SYSTEM FOR PERFORMING THE METHOD

(75) Inventors: José Antonio Lázaro Villa, Stuttgart (DE); Johannes Koppenborg, Sersheim (DE); Rudolf Wessel, Stuttgart (DE)

(73) Assignee: Avanex Corporation, Fremont, CA (US)

( * ) Notice: Subject to any disclaimer, the term of this patent is extended or adjusted under 35 U.S.C. 154(b) by 526 days.

(21) Appl. No.: 10/424,758

(22) Filed: Apr. 29, 2003

(65) Prior Publication Data
US 2004/0098432 A1 May 20, 2004

(51) Int. Cl.
*G06F 15/00* (2006.01)
*G01R 13/00* (2006.01)

(52) U.S. Cl. .......................... 708/403; 702/66; 385/37
(58) Field of Classification Search ................ 708/403, 708/404; 385/37
See application file for complete search history.

(56) References Cited

U.S. PATENT DOCUMENTS

| 5,841,919 | A | * | 11/1998 | Akiba et al. | .................. | 385/37 |
| 6,298,186 | B1 | * | 10/2001 | He | ............................... | 385/37 |
| 6,374,013 | B1 | * | 4/2002 | Whiteaway et al. | .......... | 385/37 |
| 6,728,442 | B2 | * | 4/2004 | Missey et al. | ................. | 385/37 |

OTHER PUBLICATIONS

Madsen C K et al: "A General Planar Waveguide Autoregressive Optical Filter", Journal of Lightwave Technology, IEEE. New York, US, vol. 14, No. 3, Mar. 1, 1996, pp. 437-447, XP000586133.

Vieira Segatto M E et al: "High-speed Transmission and Dispersion Characteristics of an Arrayed-Waveguide Granting", Optics Communications, North-Holland, Publishing Co. Amsterdam, NL, vol. 195, No. 1-4, Aug. 2001, pp. 151-157, XP004274329.

Yamada H et al: "Measurement of Phase and Amplitude Error Distributions in Arrayed-Waveguide Grating Multi/Demultiplexers Based on Dispersive Waveguide" Journal of Lightwave Technology, IEEE. New York, US, vol. 18, No. 9, Sep. 2000, pp. 1309-1320, XP001076507.

(Continued)

*Primary Examiner*—Chuong D Ngo
(74) *Attorney, Agent, or Firm*—Patterson & Sheridan, L.L.P.

(57) ABSTRACT

A new method for characterizing the amplitude and phase distributions of the light propagating through arrayed-waveguide gratings is presented. The new method is based on the IFT. A very good agreement of the results obtained from the IFT method in comparison with OLC method has been achieved. The new method has been applied to an AWG with a small $\Delta L$ of 22 μm where the other methods fail. The precision of this measurement is demonstrated by a good agreement between the transmittance obtained from direct measurement and from calculation using the amplitude and phase distributions. Finally we want to point out, that although the results are based on a FTS measurement, the method can be applied to any experimental technique that provides a measurement of the complex transmittance of the AWG.

20 Claims, 15 Drawing Sheets

OTHER PUBLICATIONS

Lazaro, Wessel, Koppenborg, Dudziak, and Blewett: "Inverse Fourier Transform Method for Characterizing Arrayed-Waveguide Granting", IEEE Photonic Technology Letters, vol. 15, No. 1, Jan. 2003, XP009016687.

Klekamp and Wessel: "Influence of Phase Errors on the Spectral Response of AWG Multiplexers", Journal of Optical Communications, vol. 23, No. 5, 2002, pp. 170-177, XP009016687.

Takada K et al.: "Frequency-Domain Measurement of Phase Error distribution in Narrow-Channel Arrayed-Waveguide Granting", Electronics Letters, IEEE Stevenage, GB, vol. 36, No. 2, Jan. 20, 2000, pp. 160-161, XP006014719.

Abe M et al: "Reducing in Dispersion of Silica-Based AWG using Photosensitive Phase trimming technique", Electronics Letters, IEE Stevenage, GB, vol. 38, No. 25, Dec. 5, 2002, pp. 1673-1675, XP006019437.

Muñoz, Pastor, Company, Sales: "Analytical and Numerical Analysis of Phase and Amplitude Errors in the Performance of Arrayed Waveguide Granting", IEEE Journal of Selected Topics in Quantum Electronics, vol. 8, No. 6, Nov. 2002-Dec. 2002, XP009016688.

* cited by examiner

INVERSE FOURIER TRANSFORM METHOD, PHASE CHARACTERIZATION METHOD OF OPTICAL COMPONENTS FROM TRANSMISSION AND GROUP DELAY MEASUREMENTS AS WELL AS A SYSTEM FOR PERFORMING THE METHOD

FIELD OF THE INVENTION

The invention is based on a priority application EP 02360140.4, which is hereby incorporated by reference.

The inventions relates to development, analysis and improvement of optical components.

In more particular, the invention relates to an Method for analysis optical components, in particular passive optical components, based on a inverse Fourier transform or an Z-transform and a computer program for executing the method.

BACKGROUND OF THE INVENTION

The performance of passive optical components depends on the propagation of the light through a more of less complex set of optical paths of the device. A measurement technique able to provide the characterising parameters, for example phase and amplitude of the propagation of the light through the device is a very powerful tool for the analysis, development and improvement of passive optical components.

Arrayed waveguide gratings (AWG) are key components for high-speed large-capacity dense wavelength division multiplexing (DWDM) photonic networks. They are good candidates for dense channel de/multiplexers and building blocks of devices with other functionalism e.g.: dispersion compensators, optical add and drop multiplexers, gain equalisers, etc. Due to the increasing of the transmission rate per channel, the specification regarding the slope of the group delay (GD) and the differential group delay (DGD) are becoming narrower, so that new high precision characterisation methods and equipment are required. From other side, the amplitude and phase distributions of the light propagating through each $k^{th}$ arrayed path, $(\alpha_k, \phi_k)$, is a very useful information to investigate and improve the fabrication process of the AWGs.

A solution based on Fourier Spectroscopy Technique, namely the so called Optical Low Coherence (OLC) method, is known from IEEE Journal of Lightwave Technology, 1996, 14, pp. 1677–1689; TAKADA, K. YAMADA H., INOUE, Y. "Optical Low Coherence Method for Characterizing Silicia-Based Arrayed-Waveguide Grating Multiplexers". The OLC method is in particular useful to characterise and improve AWG's, because it provides the amplitude and phase distributions $(\eta_k, \phi_k)$ of the light propagating through each arrayed waveguide of the array, k. By applying the Fourier Transform Spectroscopy (FTS), using a low coherence interferometer, an interferogram with a series of isolated fringes is provided, from which the amplitude and phase $(\alpha_k, \phi_k)$ of each arrayed-wave guide can be derived using the OLC method.

However, the solution is from basic principles and has a limited application, because it is not possible to analyze optical devices with a small or large optical path differences. The applicability of the OLC method is limited on the one hand by the coherence length of the available light sources, because it must be shorter than the delay increment ($\Delta L$) of the AWG. In other words: In order to get the isolated fringes, it is necessary to apply a broadband light source with a coherence length shorter than the $\Delta L$ of the AWG. Thus, the applicability of this method to AWG designs with narrow $\Delta L$ is therefore limited by the bandwidth of the available light sources. On the other hand, it is limited by the maximum retardation of the interferometer, which is required to be more that half the maximum optical path difference among the arrayed waveguides. This is impossible for infinite impulse response filters.

SUMMARY OF THE INVENTION

It is therefore an object of the present invention to provide a method for determining physical characteristics of an optical component that overcomes the aforementioned limitation.

Another object of the present invention is to provide a computer program and a device for performing the method.

These objects are achieved by a method according to claim 1, a computer program according to claim 9 and a device according to claim 10.

The invention provides a non-limited and very accurate method to measure and to analyse the propagation of the light through the optical device, which is a very important information to develop, analysis and improve passive optical components, for example filters, like FIR-filter, IIR-filter, discrete-time-delay optical filters etc.

The method is based in general on the Z-transform and in particular on the Direct and Inverse Fourier Transform and it can be implemented on any type of measurement of the complex transmission spectrum, e.g. Fourier Spectroscopy measurement techniques or a direct measurements of the transmission performance of the device.

The invention comprises in particular a new method to obtain the amplitude and phase distributions of AWG's. This method overcomes the limitations of previous phase characterisation methods and it can be generalised to analyse other discrete-time-delay optical filters for example FIR filter, IIR filter, ring resonator etc.

Following, a short description of the invention is given for two application examples, an AWG and a Ring Resonator.

First, with respect to an AWG a basic formula for the algorithm is an Inverse Fourier Transform implementation $$C_k = \frac{1}{T} \int_{\sigma}^{\sigma+T} H(\alpha) \cdot \exp(-i2\pi \cdot \alpha \cdot k \cdot n_{eff} \cdot \Delta L_k) \cdot d\alpha \quad \text{(AWG 1)}$$

and for the Ring Resonator application or other optical digital filters it is a Z-transform implementation:

$$h_p = (T) \int_{\sigma}^{\sigma+T} H(\alpha) \cdot \exp(j2\pi \cdot \alpha \cdot p \cdot n_{eff} \cdot L/2) \cdot d\alpha \quad \text{(RR 1)}$$

which leads to an analogue expression of (AWG 1) where the factor $n_{eff}*\Delta L$ or $n_{eff}*(L/2)$ represents a so called basic effective index step increment of the discrete-time-delay optical filter. It should be noted that the expression (RR1) represents also an Inverse Fourier Transform using the alternative definition of the Fourier Transformation. Due to that we have in (RR 1) T instead of 1/T and $j2\pi$ instead of $-i2\pi$.

Second, the derivation of the basic formula for a AWG is exemplary described. The transmission through an AWG consisting of two star couplers of radii $R_1$ and $R_2$ and propagation constants $\beta_{s1}(\sigma)$ and $\beta_{s2}(\sigma)$ joined by a set of M waveguides with lengths L(k) and propagation constant $\beta_c(\sigma)$, from a port at angle $\theta_1$ in start coupler 1 to a port at angle $\theta_2$ in start coupler 2 can be described by:

$$H(\sigma, \theta_1, \theta_2) = \sum_{k=1}^{M} \left[ a_1(k, \theta_1) \cdot a_2(k, \theta_2) \cdot \exp(i[\beta_c(\sigma)L(k) - \beta_{s1}(\sigma)R_1\alpha_1(k)\theta_1 - \beta_{s2}(\sigma)R_2\alpha_2(k)\theta_2]) \right] \quad (1)$$

where $\sigma$ is the wavenumber $\sigma=1/\lambda$, $a_1(k,\theta_1)$ and $a_2(k,\theta_2)$ are the coupling coefficients between the fields produced at the end of the port at $\theta_n$ and of the end of the arrayed waveguide k. The $\alpha_n(k)$ are the corresponding angles.

In order to characterize the AWG transmission for fixed input and output ports, Eq (1) can be simplified to:

$$H(\sigma) = \sum_{k=1}^{M} \left[ C_k \cdot \exp(i\beta_c(\sigma)L(k)) \right] \quad (2)$$

if we substitute:

$$C_k = a_1(k,\theta_1) \cdot a_2(k,\theta_2) \cdot \exp(i[-\beta_{s1}(\sigma)R_1\alpha_1(k)\theta_1 - \beta_{s2}(\sigma)R_2\alpha_2(k)\theta_2]) \quad (3)$$

The module of the complex coefficients $C_k$ and their phase are usually described as the amplitude values $|C_k|=a_k$ and phase factors Argument$(C_p)=\phi_k$, of the light passing through the $k^{th}$ path.

Any deviations from the designed parameters will turn out to a degradation of the transmission performance of the AWG. Index and core dimension inhomogeneities of the planar and channel waveguides will increase the crosstalk values. Even though the deviation from the designed parameter takes place in the array of waveguides or in the star couplers, they can be regarded as deviations from the ideal values of the complex coefficients $C_k$. Those deviations are described as amplitude and phase errors.

In case of an ideal AWG where the amplitude and phase coefficients and the effective index do not depend on a and the path-length difference between neighboring arrayed waveguides is defined by $\Delta L_k$, the transmission of an AWG can be seen as a complex periodic function $H(\sigma)$ defined by a Fourier series with complex coefficients. $C_k$. if k=1, . . . , M and $C_k=0$ for (k<1 and k>M):

$$H(\sigma) = \sum_{k=-\infty}^{\infty} \left[ C_k \cdot \exp(i2\pi \cdot \sigma \cdot k \cdot n_{\mathit{eff}} \cdot \Delta L_k) \right] \quad (4)$$

The period of the function is $\lambda_c^2/n_{\mathit{eff}}\Delta L$, which corresponds to the free spectral range (FRS) of the AWG and $\lambda_c$ is the central wavelength of the spectral range. The periodicity is obtained from the analysis of the complex transmission function. The analysis can be performed with either the real part or the imaginary part of the transmission function. But also the complex function can be used.

Due to the fact the Eq. (4) is a Fourier series, it is then possible to obtain the complex coefficients through an inverse Fourier Transformation:

$$C_k = \frac{1}{T} \int_{\sigma}^{\sigma+T} H(\alpha) \cdot \exp(-i2\pi \cdot \alpha \cdot k \cdot n_{\mathit{eff}} \cdot \Delta L_k) \cdot d\alpha \quad (5)$$

where T is the period of the $H(\sigma)$ function.

Therefore, once we have a measurement of the complex transmission of an AWG over the free spectral range and we know the optical step increment, it is possible to characterize the AWG through its amplitude and phase coefficients.

The complex transmission of the AWG can be obtained from different measurement techniques. It is possible to do that from a direct measurement of the magnitude transmission and time delay or from Fourier Transform spectroscopy. In one case we demonstrate the accuracy of the method with the OLC (optical low coherence) method. In such a way it is possible to compare the results obtained from the same measurement using the IFT (inverse Fourier Transform) and OLC methods.

The invention provides a non-limited and very accurate method to measure and to analyze the propagation of the light through the optical device which is a very important information to develop, analysis and improve passive optical components. That is a very important tool and it leads to a major breakthrough of the capabilities to develop Arrayed Waveguide Gratings.

Further advantages and developments of the invention are apparent from the description and the accompanying drawings.

It is to be understood that the aforementioned features and the features explained below can be used not only in the respective combinations described but also in other combinations or alone without departing from the scope of the present invention.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
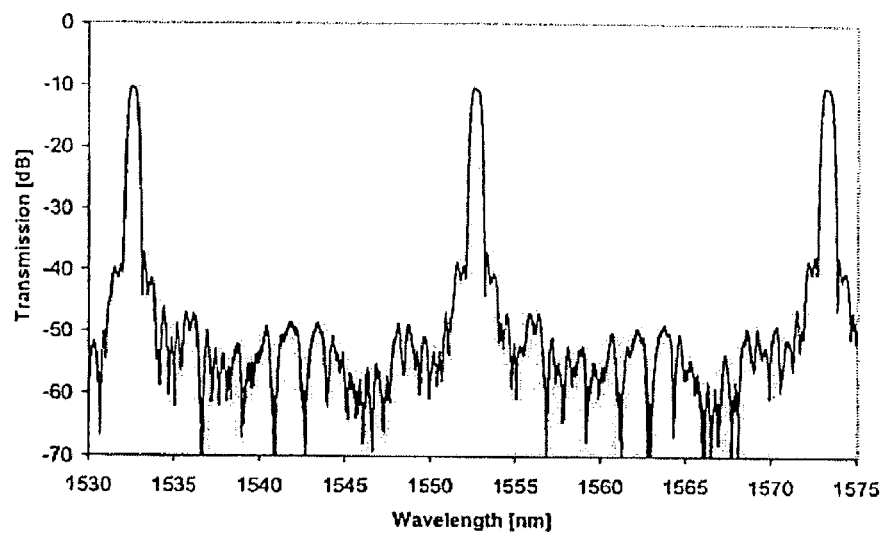
FIG. 1 shows a transmission spectrum of an AWG.

According to the invention a method for characterising optical components, in particular Arrayed-Waveguide Gratings (AWG) and Double Coupler Ring Resonator (DCRR), as well a computer program and a device for executing the method is provided.

Following the Inverse Fourier Transform (IFT) method according to the invention is exemplary described for characterising an Arrayed-Waveguide Gratings (AWG).

Arrayed-Waveguide Gratings (AWG):

The Inverse Fourier Transform method (IFT) has been developed to measure the phase and amplitude distributions of an AWG in advantageous manner. The IFT method according to the invention is a first application of a wavelength-domain measurement instead of to a Fourier Transform Spectroscopy (FTS) based measurement. In such a way, a single measurement of the complex transmission of the AWG and its IFT analysis provides a full characterisation of the AWG.

The method according to the invention enables a characterisation of phase and amplitude errors in AWGs based on Inverse Fourier Transformation (IFT). It overcomes the limitations of previous Optical Low Coherence methods (OLC), allowing the characterisation of AWGs with any step increment ($\Delta L$). The method has been successfully used to characterise an AWG with a $\Delta L$ of only 22 μm. A comparison between the results from IFT and OLC methods shows a standard deviation of the phase errors of 2° for an AWG with a $\Delta L$ of 51 μm.

Measurement Principle:

The transmission of an AWG can be described as a complex periodic function $H(\sigma)$, defined by a Fourier series with complex coefficients, $C_k$, and the period of the function is the free spectral range (FSR) of the AWG. The module of the complex coefficients Ck and their argument correspond, respectively, to the $(\alpha_k, \phi_k)$ distributions and the value of the $C_k$ parameters can be obtained by the application of the IFT method to the complex transmission of the AWG along the FSR. The next section describes the obtaining of the complex amplitude transmission of the AWG from a measurement of its power transmission and group delay (GD). In parallel, the known OLC method was used to obtain the amplitude and phase distribution $(\alpha_k, \phi_k)$ and test the accuracy of the new method.

The transmission through an AWG consisting of two star couplers of radii $R_1$ and $R_2$ and propagation constants $\beta_{s1}(\sigma)$ and $\beta_{s2}(\sigma)$ joined by a set of M waveguides with lengths $L(k)$ ($k=1, \ldots, M$) and propagation constant $\beta_c(\sigma)$, from a port at angle $\theta_1$ in star coupler 1 to a port at angle $\theta_2$ in star coupler 2 can be described by:

$$H(\sigma,\theta_1,\theta_2)=\Sigma_{k=-\infty}^{\infty}\{a_1(k,\theta_1)a_2(k,\theta_2)\exp(i[\beta_c(\sigma)L(k)-\beta_{s1}(\sigma)R_1\alpha_1(k)\theta_1-\beta_{s2}(\sigma)R_2\alpha_2(k)\theta_2])\}$$

where $i=\sqrt{-1}$, $\sigma=1/\lambda$ is the wave number, $a_1(k,\theta_1)$ and $a_2(k,\theta_2)$ are the coupling coefficients between the fields produced at the end of the port located at the angle $\theta_n$ ($n=1,2$) and at the end of the arrayed waveguide k and $\alpha_n(k)$ are the corresponding angles. The transmission of an ideal AWG, where the described parameters do not depend on the wavenumber, can be described as a complex periodic function $H(\sigma)$, defined by a Fourier series with complex coefficients, $C_k$.

If $C_k=0$ for ($k<1$ and $k>M$)

then $$H(\sigma)=\Sigma_{k=-\infty}^{\infty}[C_k \exp(i2\pi\sigma k\, n_{eff}\Delta L)], \qquad \text{Eq. (1)}.$$

And the period of the function is the free spectral range (FSR) of the AWG. The complex coefficients $C_k$ summarise all the design characteristics, $$C_k=a_1(k,\theta_1)a_2(k,\theta_2)\exp(i[\beta_c(\sigma)(L(k)-k\cdot\Delta L)-\beta_{s1}(\sigma)R_1\alpha_1(k)\theta_1-\beta_{s2}(\sigma)R_2\alpha_2(k)\theta_2]),$$

where $\Delta L$ is the mean value of the path lengths of the arrayed waveguides. The module of the complex coefficients $C_k$ and their argument correspond to the amplitude and phase distributions ($|C_k|=\eta_k$, $\text{Arg}(C_p)=\phi_k$) of the light passing through the $k^{th}$ path. The factor $\exp(i[\beta_c(\sigma)(L(k)-k\cdot\Delta L)])$ takes into account a possible chirping of the path lengths and describes them as an extra phase. Any deviation from the designed parameters will produce a degradation of the transmission performance of the AWG. For example, index and core dimension inhomogeneities of the arrayed waveguides will increase the crosstalk values. Those deviations will be shown as discrepancies from the ideal values of the complex coefficients $C_k$ and they are called amplitude and phase errors.

Due to the fact that Eq. (1) is a Fourier series, it is possible to obtain the complex coefficients through an inverse Fourier Transformation:

$$C_k=(1/T)\int_{\sigma}^{\sigma+T} H(\alpha)\exp(-i2\pi\alpha k\, n_{eff}\Delta L)d\alpha. \qquad \text{Eq. (2)}$$

where T is the period of the $H(\sigma)$ function. Therefore, based on a measurement of the complex transmission of an AWG along the FSR, it is possible to characterise the AWG through its amplitude and phase coefficients. The complex transmission of the AWG can be obtained from different measurement techniques. It is possible to perform a direct measurement of the transmittance and the time delay or to apply FTS. In order to compare the results obtained from IFT method according to the invention and OLC method of the state of the art, a fiber-optic Mach-Zehnder interferometer, which is similar to the one reported for the OLC, has been used for the measurements.

Figure 2:
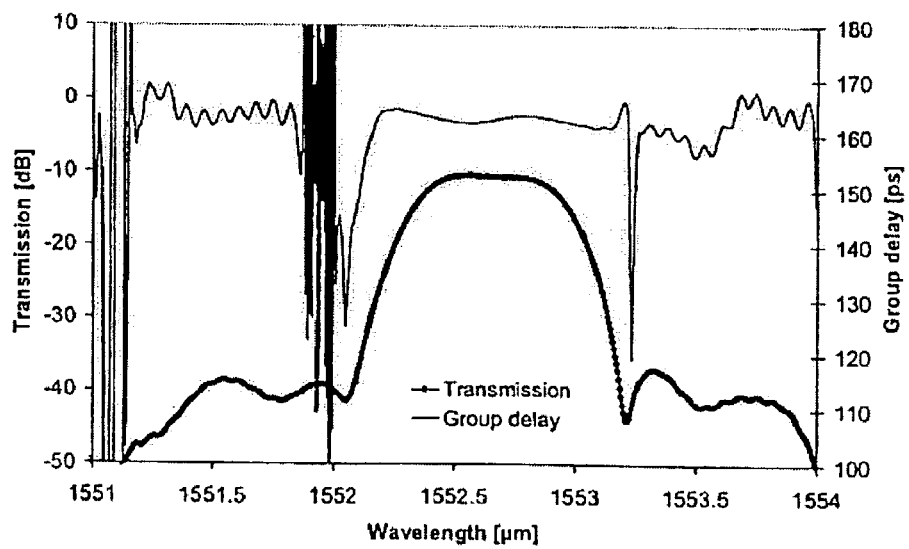
FIG. 2 shows a detail of the group delay around the central transmission peak of FIG. 1.

Transmission and Group Velocity Dispersion Measurements:

The used sample is a 16×100 GHz AWG module with 121 arrayed-waveguides and $\Delta L=80,3$ μm. The power transmission and group delay (GD) measurement has been done with the state of the art, Agilent 81910A "All Parameter Test Solution" equipment. FIG. 1 shows the transmission spectrum. It shows 3 peaks and a FSR of the AWG of 20.35 nm. FIG. 2 shows a detail of the GD measurement around the central peak.

To facilitate a measurement of the complex transmission of the AWG, H(σ), the transmission phase has been calculated by an integration process of the GD measurement.

Figure 3:
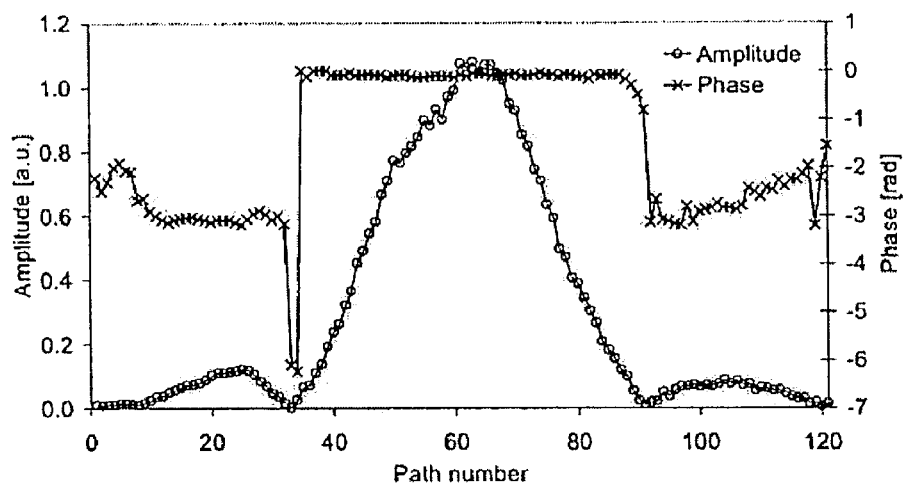
FIG. 3 shows amplitude and phase distributions of the AWG obtained from the IFT method according to the invention.

Phase and Amplitude Characterisation:

FIG. 3 shows the amplitude and phase distributions ($\alpha_k$, $\phi_k$) obtained by the application of the IFT method to the complex transmission of the AWG.

The amplitude and phase distributions ($\alpha_k$, $\phi_k$) are obtained by applying the basic formula of the AWG (equation AWG1) to the measured complex transmission.

$$C_k = \frac{1}{T}\int_{\sigma}^{\sigma+T} H(\alpha) \cdot \exp(-i2\pi \cdot \alpha \cdot k \cdot n_{\mathit{eff}} \cdot \Delta L_k) \cdot d\alpha \quad (\text{AWG 1})$$

Thereby, the calculating the coefficients $C_k$ takes place by an iterative process based on product ($n_{\mathit{eff}} \Delta L$). $n_{\mathit{eff}}$ is the effective refractive index and ΔL is called the step increment of the AWG which is the increment of the physical length of the different paths that the light follow going thought the AWG. $n_{\mathit{eff}}\Delta L$ can be called the "effective index step increment" and it is directly related with the time-delay step increment of the optical filter through: $\Delta t = c/(n_{\mathit{eff}} \Delta L)$.

Figure 15A:
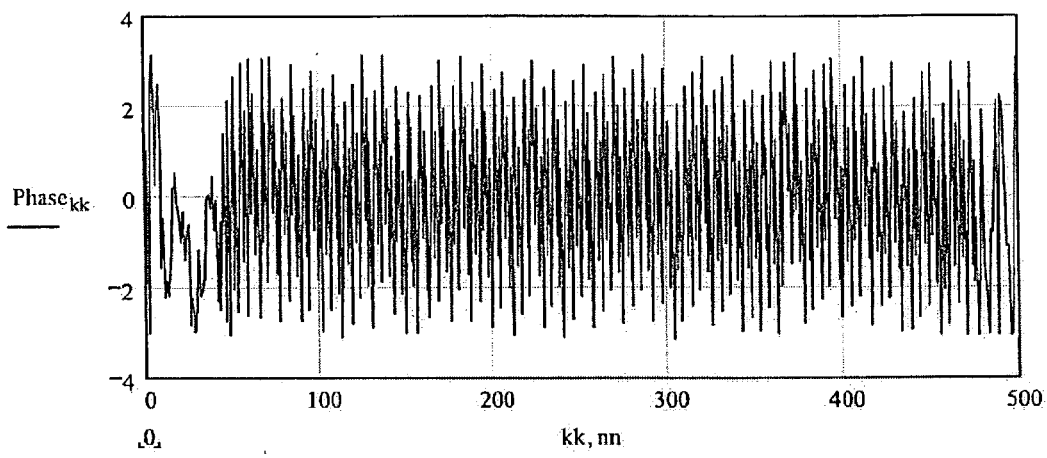
FIG. 15a/b to FIG. 17a/b show the phase and amplitude distribution for different approximate values of $(n_{eff}\Delta L)$ for the AWG, and FIG. 18a/b to FIG. 20a/b show the phase and amplitude distribution for different approximate values of $(n_{eff}\Delta L_k)$ for the RR.
Figure 15:
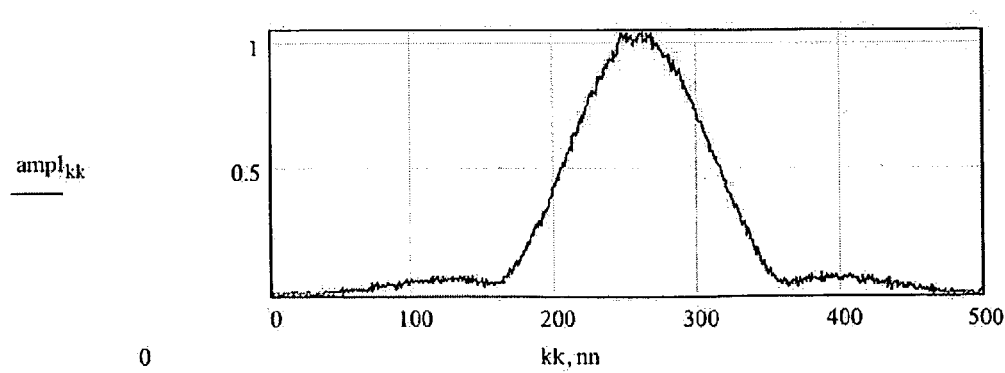

First the product of the effective refractive index $n_{\mathit{eff}}$ and the step size $\Delta L_{k,i}$, i.e. the effective index step increment of the AWG is set to the free spectral range (FSR) of the AWG. Then the phase distribution of the AWG is calculated from the imaginary part of the coefficients $C_k$. FIG. 15*a/b* shows the phase (FIG. 15*a*) and amplitude (FIG. 15*b*) distribution for the AWG for the first approximate value of the product $n_{\mathit{eff}} \Delta L_k$. is the FSR of the AWG. The phase distribution shows a plurality of 2π jumps in the phase distribution. In the next step the number of the 2π jumps of the phase is minimised by varying the product $n_{\mathit{eff}} \Delta L_k$. This could be done by several calculate methods, for example by simply counting the number of neighbouring point with a difference greater or equal to 2π. Some scientific calculating programs have also already built-in functions for executing such a minimisation.

Figure 16A:
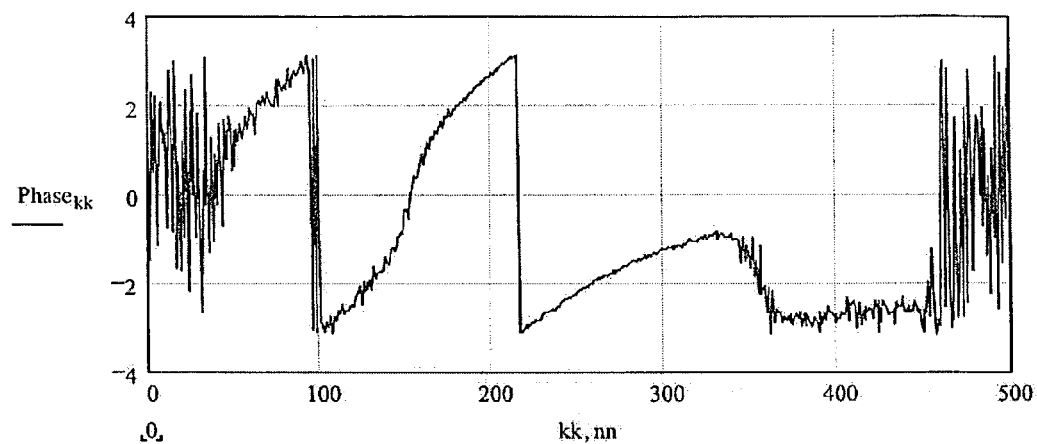
Figure 16:
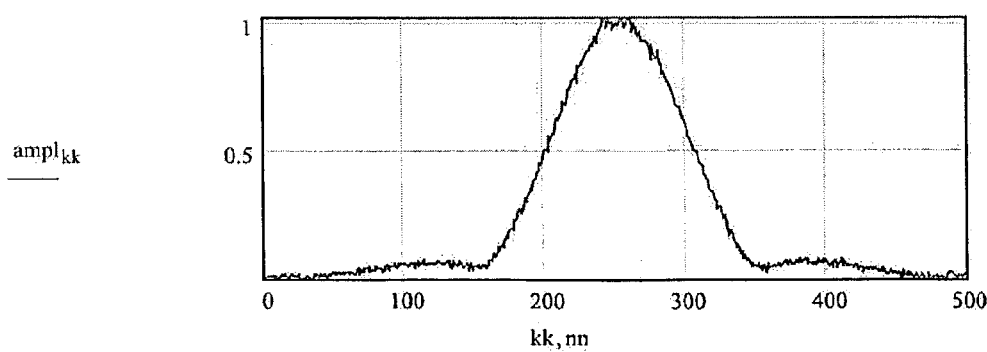

In FIG. 16*a/b* the phase and amplitude distribution is shown for approximate value of $n_{\mathit{eff}} \Delta L_k$., for which a minimisation of nearly all the 2π jumps has been made. In the channel range between 100 and 200 of FIG. 16*a* a kind of sloping plateau of the phase distribution is recognisable. After minimising the number of 2π jumps in the phase distribution, the next step of the iterative process is to vary the $n_{\mathit{eff}} \Delta L_k$. product in order to minimise the slope of plateau of the phase distribution, i.e. to achieve a horizontal plateau. In mathematics it is well know how to determine the slope of a curve or a plateau and more or less complex mathematics algorithm are known. For example one possible solution is to approximate the plateau by straight line and than to determine the slope of the straight line.

Figure 17A:
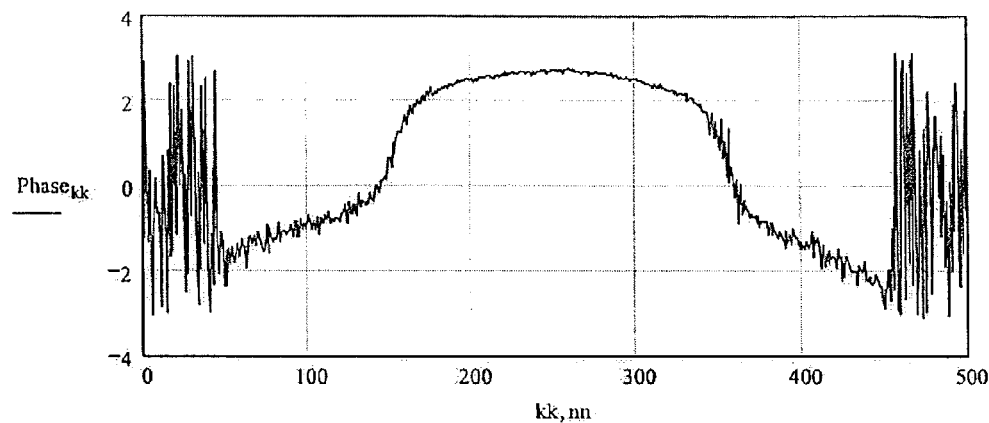
Figure 17B:
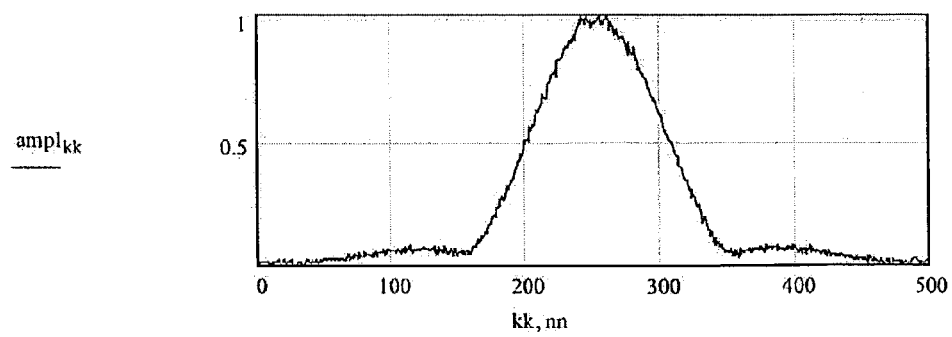

In FIG. 17*a/b* the phase and amplitude distribution is shown for a correct approximated value of the product $n_{\mathit{eff}} \Delta L_k$.

Figure 4:
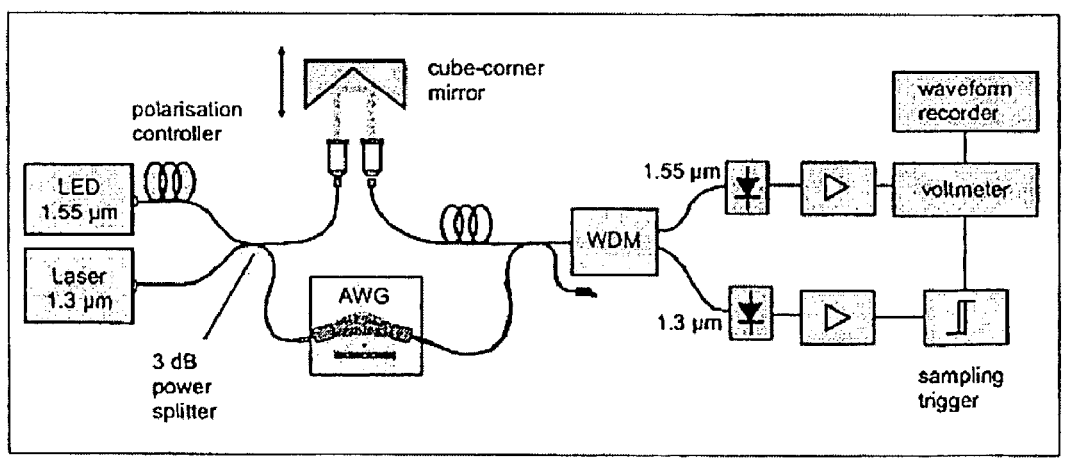
FIG. 4 shows an experimental set-up used for Fourier Transform Spectroscopy.

Set-up Description:

In parallel, a FTS measurement of the same AWG module has been done. FIG. 4 shows an outline of the set-up. The measurement arrangement comprises a fiber-optic Mach-Zehnder interferometer which includes an LED as broadband light source and a tuneable 1.3 μm laser to sample the interferogram at each λ/2 intervals. The spectrum emission of the LED source coupled into the AWG is close to a Gaussian profile, with a central wavelength $\lambda_o$=1542.3 nm and a half-width at 1/e maximum (δσ) of 1.52×10$_{-2}$ μm. In order to check the validity of the method, we have selected an AWG with a ΔL=51.3 μm to compare the results obtained from both methods. The X parameter (X=πδσn ΔL, n=1.45) is 3.5 for this AWG design. The fringes are not completely separated because X<4.4, but they can be identified. It is then possible to achieve good values within ±5%, ±1° maximum errors if we limit the analysis to the central wavelengths of the spectrum: −0.5=(σ−$\sigma_o$)/δσ=0.5.

Comparison of Results from the IFT and the OLC Methods:

In order to apply the IFT method, the complex transmittance function of the sample, H(σ), has been obtained from a Fourier transformation of the interferogram and the emission spectrum of the LED. Applying Eq. (2) we can calculate the complex coefficients $C_k$ and the amplitude and phase distributions.

Figure 5:
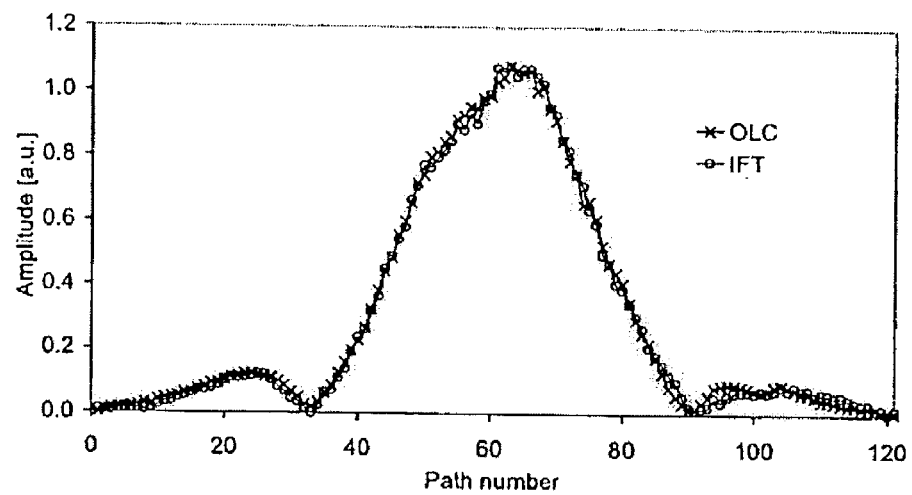
FIG. 5 shows a comparison of the amplitude distribution obtained from the state of the art (OLC) and the method according the invention (IFT)
Figure 6:
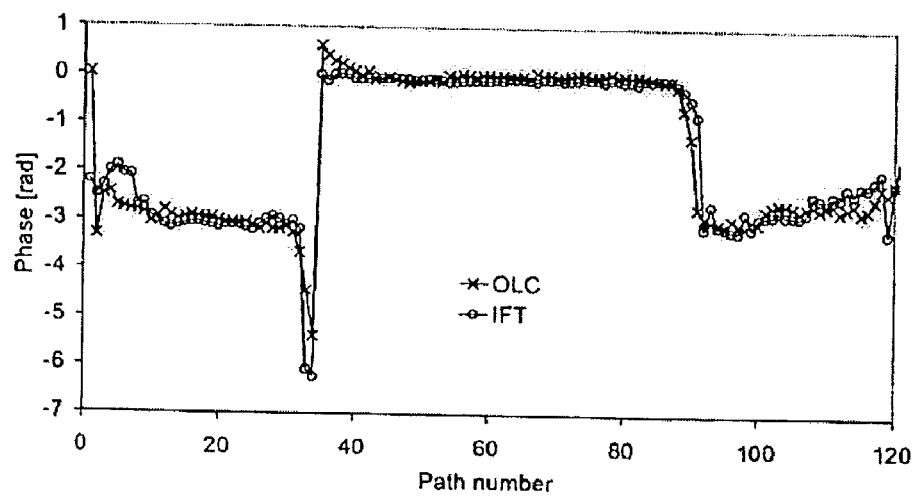
FIG. 6 shows a comparison of the phase distribution obtained from the state of the art (OLC) and the method according the invention (IFT)

FIGS. 5 and 6 show a comparison of the amplitude and phase distributions obtained from the FTS measurement and the OLC method with the previous results of FIG. 3. The amplitude distributions obtained from the OLC method (crosses) and from the IFT one (circles) is shown in FIG. 5, whereas the phase distributions obtained from the OLC method (crosses) and from the IFT one (circles) is shown in FIG. 6.

There is a general good agreement between the results obtained from both methods. Despite of it, some differences can be noticed and they are attributed to the polarisation dependency of the ($\alpha_k$, $\phi_k$)distributions.

Figures 7A, 7B:
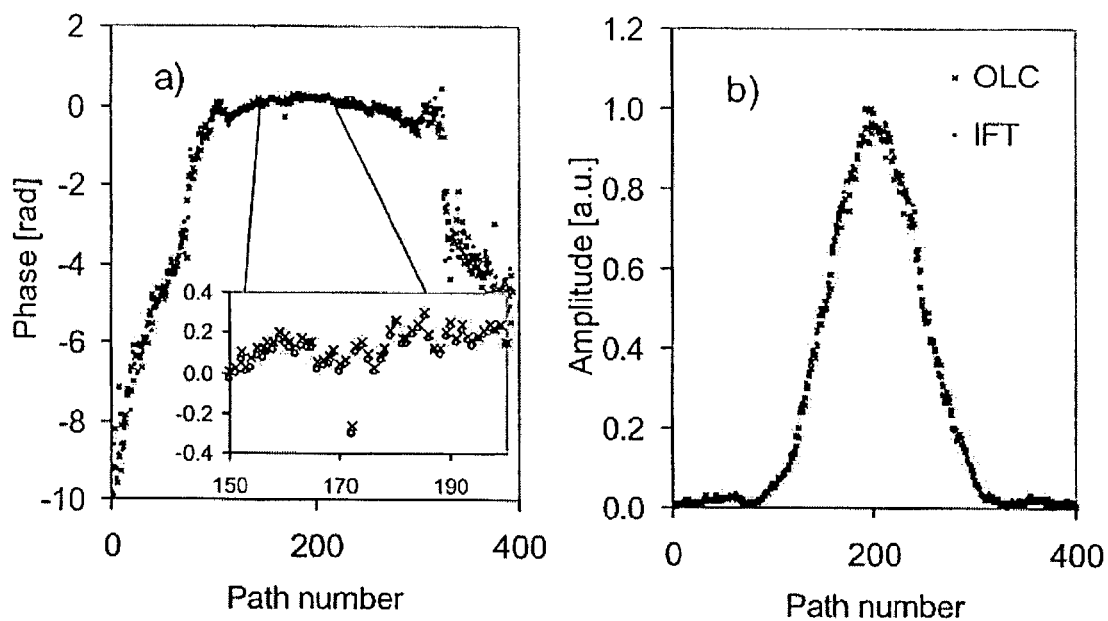
FIG. 7*a/b* shows a further comparison of the phase and amplitude distribution o a AWG.

FIGS. 7*a*) and 7*b*) shows a further comparison of the phase and amplitude values obtained from IFT and OLC methods. These are results from an AWG with a designed ΔL=51.3 μm, wherein the phase distributions (FIG. 7*a*) and amplitude distributions (FIG. 7*b*) from the OLC method are represent by crosses and from the IFT method by dots. There is a very good agreement between the results obtained from both methods. The standard deviation between the amplitude and phase distributions is 3.2 10$^{-3}$ and 2.1° respectively, for the 200 central path numbers.

Figure 8:
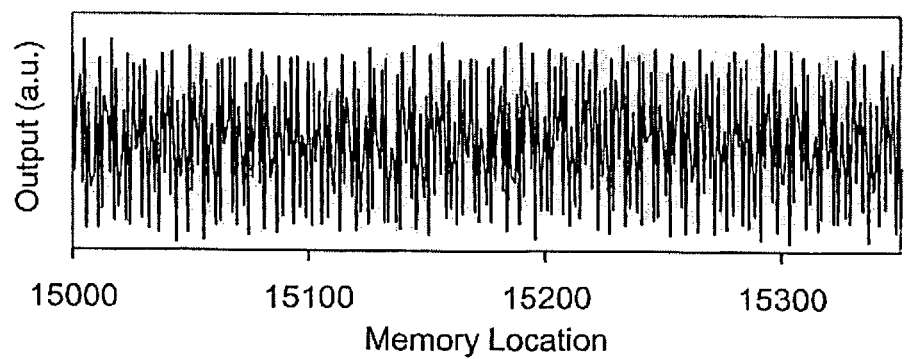
FIG. 8 shows a detail of an interferogram of an AWG.

FIG. 8 shows a detail of a interferogram obtained from an AWG with a designed ΔL=22.4 μm, i.e. with a narrow path-length difference between neighbouring arrayed waveguides. For this sample, it is not possible to separate the fringes.

Figure 9A:
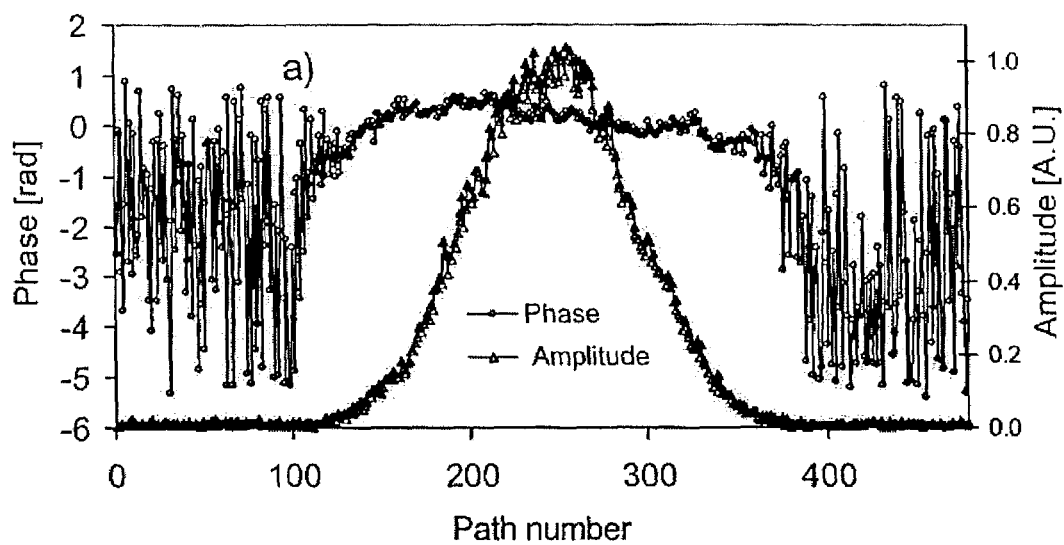
FIG. 9*a/b* show results from an AWG with a narrow path-length difference.
Figure 9B:
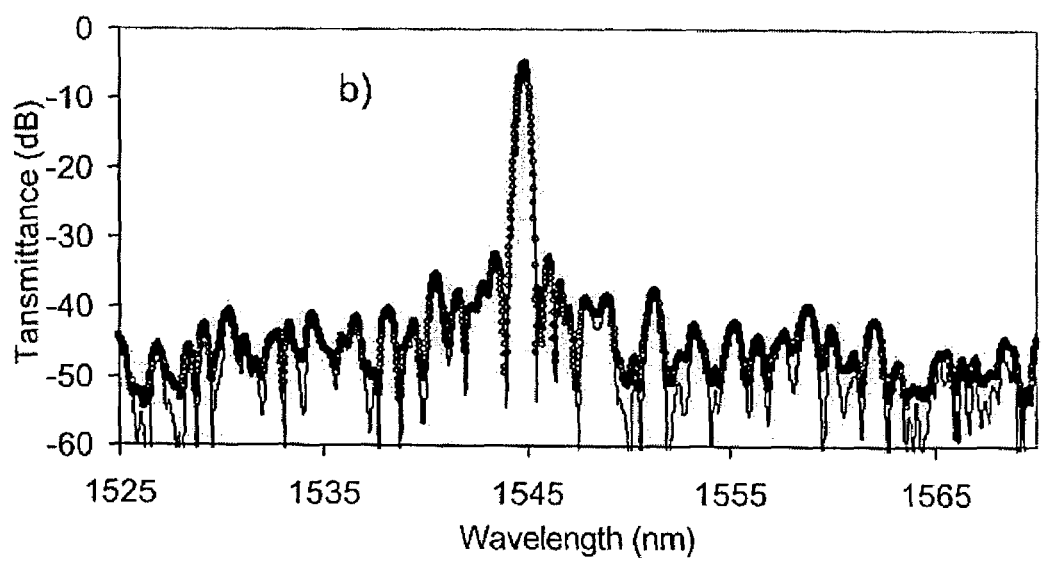

The IFT method has been applied to characterise this AWG with a designed step increment ΔL=22.4 μm and the results are shown in FIG. 9. In particular, the phase and amplitude distributions obtained from the IFT method are shown in FIG. 9*a* and the transmission obtained from the phase and amplitude distributions (line) and direct measurement (dots) is shown in FIG. 9*b*).

The amplitude of the first and the last 100 path numbers are quite close to the mentioned noise level and this is the reason for the high phase errors of those channels. In order to check the precision of the results, and due to the lack of results from the OLC method, we have calculated the magnitude transmittance for that AWG. The calculated profile is compared with a direct measurement of the transmittance in FIG. 9*b*). A very good agreement between the calculated and measured results is obtained even at signal levels 50 dB below the maximum and a span of 45 nm. That confirms that the higher errors of the first and the last 100 path numbers do not have a strong influence on the magnitude transmittance profile, FIG. 9*b*), because the amplitude of transmission through those paths, FIG. 9*a*), is very small.

Estimation of the Measurement Errors:

The numerical subroutine to calculate the complex coefficients $C_k$, gives as result a set of copies of the $C_1$ to $C_M$ values, spaced by the inverse of the non-dimensional sampling rate ($\Delta\sigma\, n_{\mathit{eff}}\, \Delta L$). The sampling rate of the transmittance function depends on the scan length of the interferogram and it was long enough to provide a sampling rate under the Nyquist rate. The aliasing between adjacent copies is then avoided. The value of complex coefficients between two neighbouring copies should be zero. Instead of that, we got a floor line with a mean value of $6.02\, 10^{-4}$. We have also tested through numerical simulations that if we introduce an extra error in the measurement of the complex transmittance function the level of the floor between adjacent copies lift up proportionally. Because of that, we interpret the value of this floor as an estimation of the mean value of the error in the determination of the values of the amplitude distribution. As a consequence, the mean value of the error in the determination of the values of the phase distribution, $\sim\sin^{-1}[(6.02\cdot 10^{-4})/\eta k]$, depends also on the errors in the determination of the amplitude.

Conclusion of the AWG Example:

A very good agreement of the results obtained from the IFT method according to the invention in comparison with OLC method has been achieved. The new method has been applied to an AWG with a small $\Delta L$ of 22 µm where the other methods fail. The precision of this measurement is demonstrated by a good agreement between the transmittance obtained from direct measurement and from calculation using the amplitude and phase distributions.

Although the IFT method is described in connection with measurement results based on a FTS measurement, the method can be applied to any experimental technique that provides a measurement of the complex transmittance of an optical component, e.g. an AWG.

Further improvements comprises defined TE and TM polarisation input states for the die level measurement and Muller-matrix method for the module. The Inverse Fourier Transform method according to the invention provides the amplitude and phase distributions of an AWG from a measurement of its transmission and GD. Using defined AWG-input polarisation states this measurement and the IFT analysis provides a full characterisation of the AWG. This method is also applicable to other optical filter components like Ring Resonators.

Following the IFT method according to the invention is exemplary described for a further embodiment, namely in case of a Ring Resonator.

Ring Resonators:

Ring resonators (RRs) recently gained great attention due to their potential for DWDM-applications, e.g. dispersion compensation and ultra-compact Add&Drop multiplexers. At present, however, the application of RRs is restricted to niche applications due to the high FSR (Free Spectral Range) and the performance required for DWDM-systems. Meanwhile, first ring resonators with FSR-values in the THz-range have been demonstrated and intensive research is performed aiming at the realization of devices ready for system applications. The motivation for this work is to extend phase sensitive characterization methods successfully demonstrated on AWGs (Arrayed Waveguide Gratings) to ring resonators. This is demanding since data rates exceed the range of 10 Gb/s with a scope of 160 Gb/s.

Figure 10:
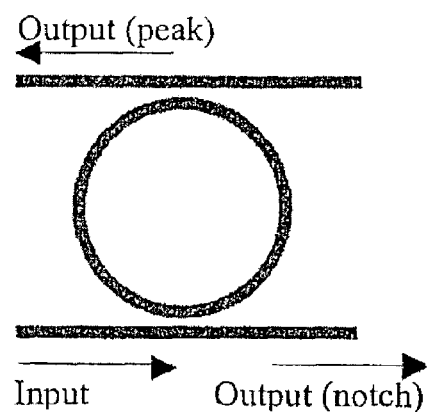
FIG. 10 shows schematically the configuration and transmission from a Double Coupler Ring Resonator (DCRR)

Theory:

FIG. 10 shows schematically the configuration and transmission from a Double Coupler Ring Resonator (DCRR). The complex transmittance of a Symmetric DCRR (SD-CRR), throughout the Output (peak), can be described by the expression:

$$H(\beta) = \sqrt{1-\gamma}\,\frac{(1-y^2)\cdot\sqrt{1-\gamma}\cdot\exp(-\alpha L/4 - j\beta L/2)}{1 - y^2\cdot(1-\gamma)\cdot\exp(-\alpha L/2 - j\beta L)} \quad (1)$$

where $\alpha$ is the loss per length, L is the perimeter of the ring, $\beta$ is the propagation constant of the waveguide ring, $\gamma$ is the excess loss of the coupler, and y is related to the coupling efficiency $\eta$, by $y=\sqrt{1-\eta}$. In order to study the information available by a Fourier Spectroscopy analysis of the transmission from a SDCRR, a simulation The calculated magnitude and phase transmission spectrum of a SDCRR according to Equation (1) is shown in FIGS. 11a (magnitude) and 11b (phase). The design Parameters are: $\gamma=0.023$ (0.1 dB), $\alpha=0.23$/cm (1 dB/cm), R=3 mm (RR radius), $\eta=0.015$, $n_{\mathit{eff}}=1.46005$ (effective index of the monomode ring waveguide, taken as constant without dispersion).

As evident from equation (1) and FIG. 2 the spectral response of an RR is periodic. The periodic filters are digital filters, because its transmission can be described completely by a sequence of signals sampled at a unit delay T and the multiples thereof. Vice versa, digital filters have a periodic frequency spectrum. Thus, the concept of the Z-transformation can be applied. The transmission of a digital filter can be then described, using the Z-transform, as a ratio of polynomials or a, in general, a infinite series:

$$H(z) = \left(\sum_{m=0}^{M} b_m \cdot z^{-m}\right)\bigg/\left(1 + \sum_{n=1}^{N} a_n \cdot z^{-n}\right) = \sum_{p=-\infty}^{\infty} h_p \cdot z^{-p} \quad (2)$$

where $a_n$, $b_m$ and $h_p$, they are in general complex magnitudes and $h_p$ is called the impulse response of a filter. Also, a region of convergence of the power series has to be specified, for example by $r_{min} \leq |z| \leq r_{max}$, were $r_{min}$ and $r_{max}$ are radii. The case $|z|=1$ is called the unit circle, because the filter's frequency response is found by evaluating H(z) along $z=\exp(j\omega)$, where $\omega$ is the normalized angular frequency, $\omega=2\pi\nu/\text{FSR}$.

The Z-transform of the SDCRR can be obtained by the substitution $\exp(-j\beta L/2)=z^{-1}$ in Eq (1). It can be demonstrated by a Taylor expansion of Eq (1), that the Z-transform function of the SDCRR can be described by the infinite series:

$$H(z) = (1-y^2)\cdot(1-\gamma)\cdot \quad (3)$$
$$\exp(-\alpha L/4)\cdot\left[\sum_{n=1}^{\infty} y^{2n}\cdot(1-\gamma)^n\cdot\exp(-n\alpha\cdot L/2)\cdot z^{-2n-1}\right]$$

The Eq (3) means that the transmission of a DCRR through its Output (peak) is equivalent to a Fourier Transform of an infinite set of impulses, each one corresponds to an odd number of unit delays. Once we have a Z-transform description of the filter as shown in Eq. (3), it is then possible to obtain the value of the impulse responses of the filter, $h_p$, by applying the Cauchy integral:

$$h_p = (1/2\pi j) \oint H(z) z^{p-1} \cdot dz \qquad (4)$$

It should be noticed that the Cauchy integral of Eq (4) is an integral along a closed circle of the complex plane. From the other side, a measurement of the complex transmission of a RR corresponds to values of the function H(z) along the unit circle z=exp(jω). Due to that, the impulse responses $h_p$ can be obtained from the application of the Cauchy integral to the complex transmission of the RR along a FSR.

By substituting exp(−jβL/2)=$z^{-1}$ in Eq (4), the basic formula for the ring resonator is achieved $$h_p = (T) \int_{\sigma}^{\sigma+T} H(\alpha) \cdot \exp(j2\pi \cdot \alpha \cdot p \cdot n_{\mathit{eff}} \cdot L/2) \cdot d\alpha \qquad (RR\ 1)$$

Figure 11:
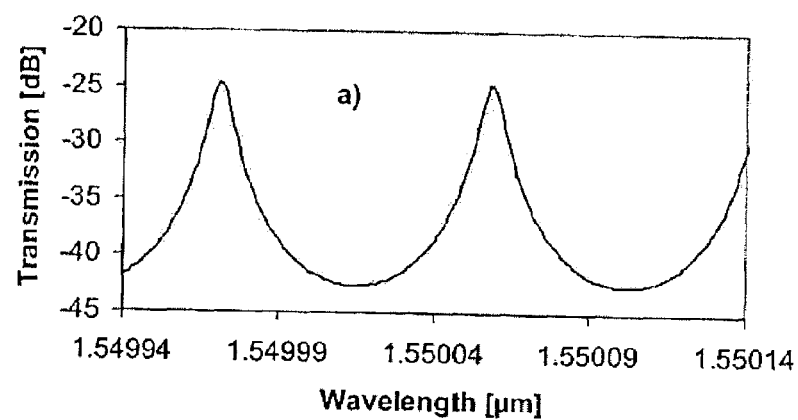
FIG. 11*a/b* show a calculated magnitude and phase transmission spectrum of a Symmetric Double Coupler Ring Resonator (SDCRR)
Figure 11:
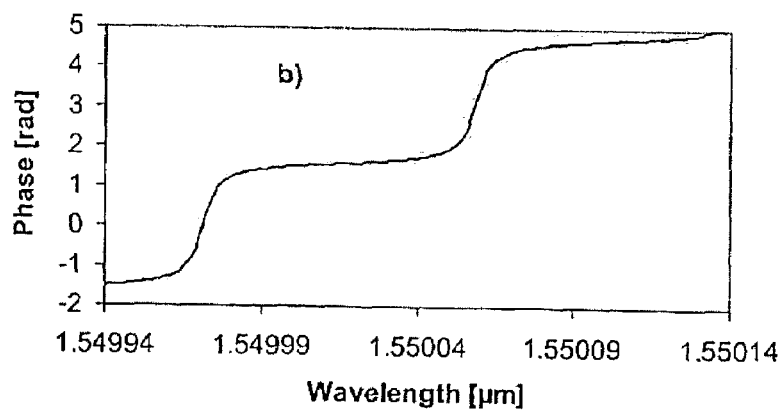
Figure 12:
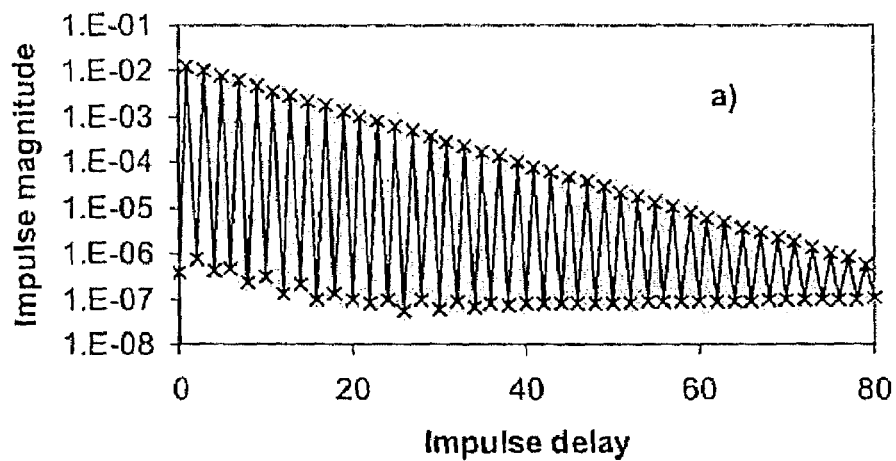
FIG. 12*a/b* show the calculated magnitude and phase of the impulse response of the SDCRR.
Figure 12:
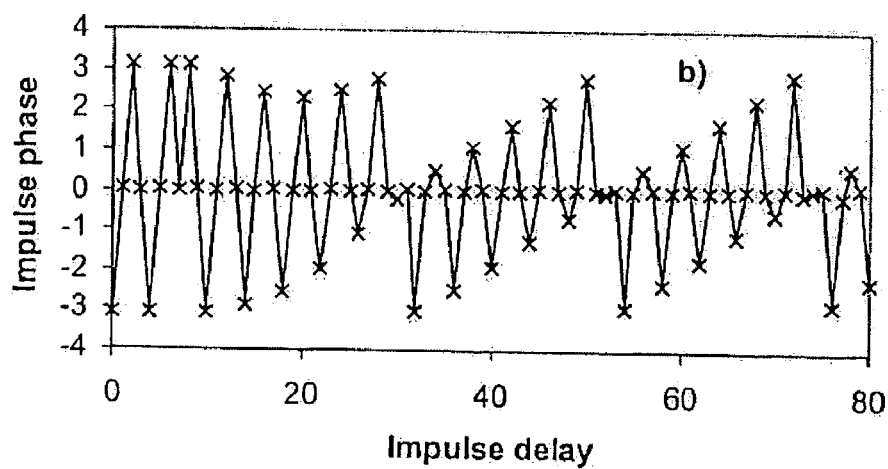

FIG. 12 shows the magnitude (FIG. 12a) and phase (FIG. 12b) of the impulse response of the Symmetric Double Ring Resonator (SDCRR) for the complex transmission and design parameters shown in FIG. 11. It has been obtained by applying the Cauchy integral to the complex transmission calculated from Eq (1) and shown in FIG. 11. Even though strictly speaking, it is only necessary to take a single FSR, on the other side, it is also necessary to use a very small wavelength step and a very precise determination of the FSR. An alternative solution to increase the precision of the results with a large wavelength step is to integrate over several FSRs. In such a case, also the error in the determination of the FSR has a smaller impact. The results shown in FIG. 12 have been obtained from 14 FSRs. Due to the fact that, the best numerical conditions to implement the Cauchy integral on a measurement depends also on its conditions, a detailed analysis should be done a posteriori. In case of a SDCRR, the unit delay is half of the ring round trip (L/2), and the impulses transmitted throughout the Output (peak) corresponding to an even number of unit delays all are zero and correspondingly, even values of the impulse phase have arbitrary values. Only odd delays have a magnitude non null value and defined phases.

It can be observed that it is possible to determine the magnitude and phase of the impulses in a dynamic range of ~5 orders of magnitude. This can be use as an estimation of the actual precision of the method. For the case used in the simulation, it covers more than 40 impulses. The impulse analysis of the transmission through the Output (peak) provides a characterization of the half round turn loss x the $\sqrt{1-\mathrm{couplingexcessloss}}$ of the SDCRR, which can be obtained from the relative value of two consecutive magnitude impulses.

Experimental Results:

The magnitude and phase (peak) transmission through the Output (peak) of a SDCRR have been obtained from a measurement of the transmission and time delay. FIG. 13a) shows the measured magnitude transmission. The phase of the transmission has been calculated from the direct measurement of the time delay by a numerical integration process, FIG. 13b).

Figure 13:
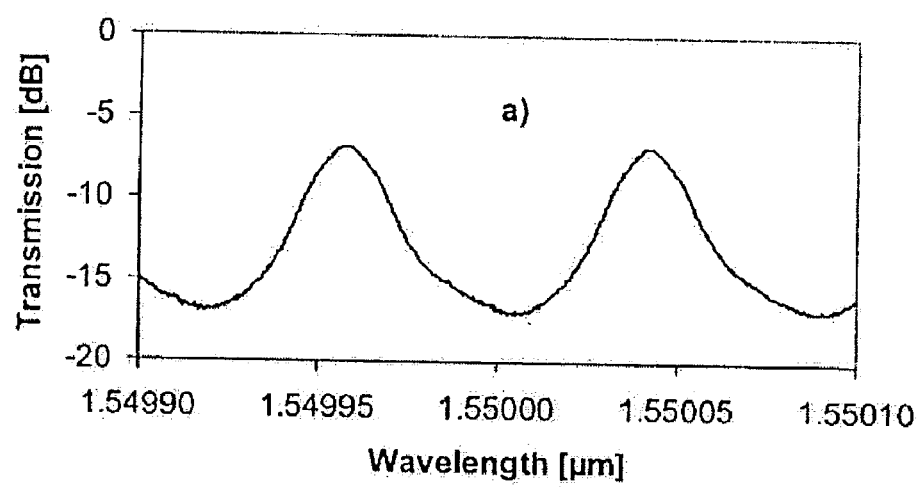
FIG. 13a/b show the experimental magnitude and phase of the transmission spectrum of the SDCRR, FIG. 14a/b show the magnitude and phase of the impulse response obtained from the transmission measurement of FIG. 13.
Figure 13:
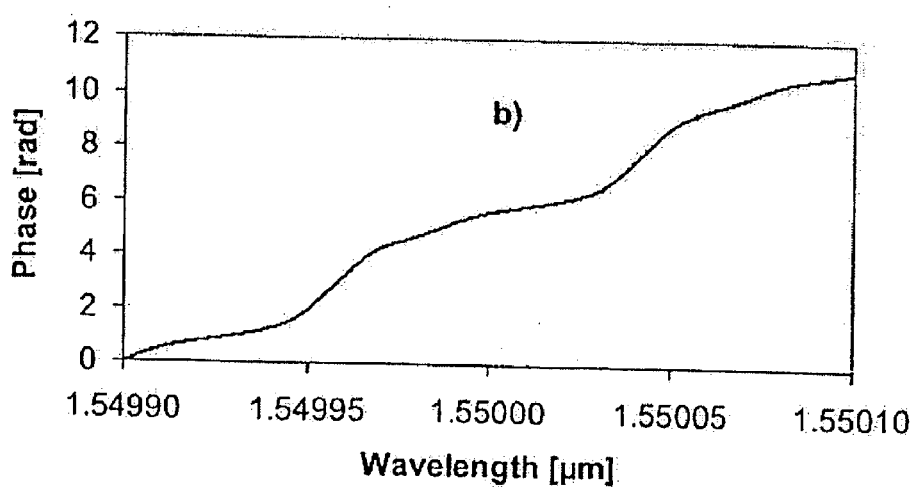
Figure 14:
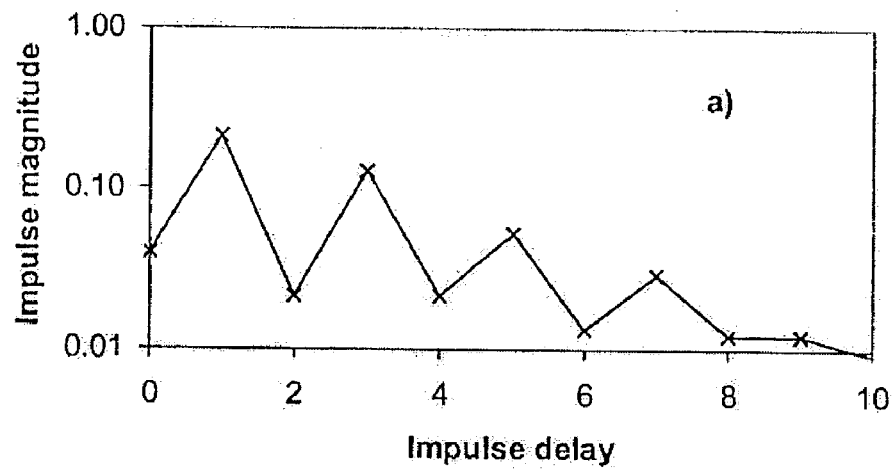
Figure 14:
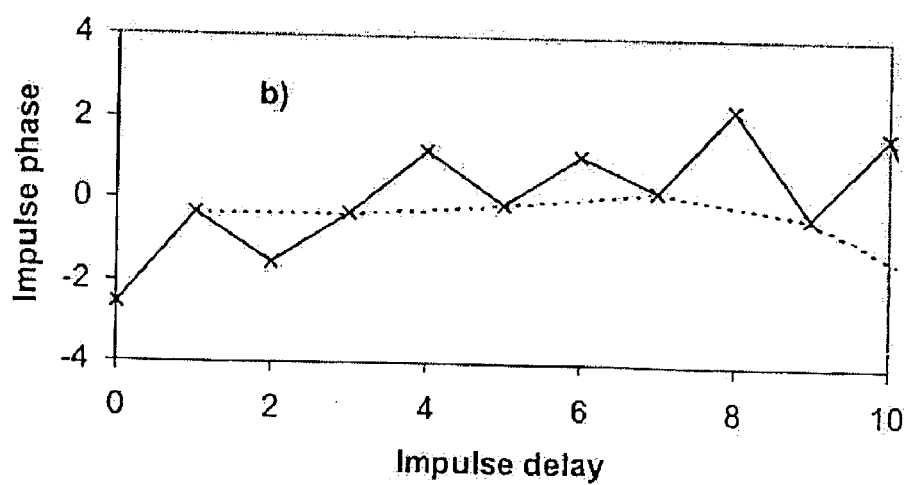

Applying the Cauchy integral to the experimental data of FIG. 13, we obtain the impulse response shown in FIG. 14. It can be observed a good qualitative agreement between the modeling and experimental results. The first measurements on a symmetric double coupled ring resonator show a good agreement with previous simulations results.

The results are achieved by a similar iterative algorithm as described for the AWG, based on the basic formula (RR1) for the ring resonator.

$$h_p = (T) \int_{\sigma}^{\sigma+T} H(\alpha) \cdot \exp(j2\pi \cdot \alpha \cdot p \cdot n_{\mathit{eff}} \cdot L/2) \cdot d\alpha \qquad (RR\ 1)$$

Figure 18A:
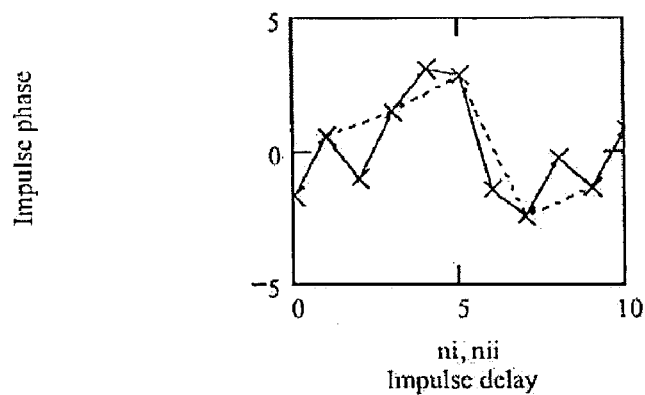
Figure 18B:
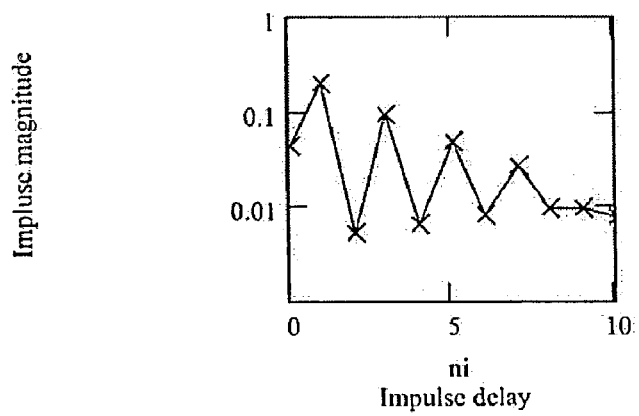

First the product of the effective refractive index $n_{\mathit{eff}}$ and the step size $\Delta L_k$ of the RR, i.e. the effective index step increment of the RR is set to the free spectral range (FSR) of the RR. Then the phase distribution of the AWG is calculated from the imaginary part of the coefficients $C_k$. FIG. 18a/b shows the phase (FIG. 18a) and amplitude (FIG. 18b) distribution for the RR for the first approximate value of the product $n_{\mathit{eff}} \Delta L_k$. is the FSR of the RR. Next, the number of the 2π jumps of the phase is minimised by varying the product $n_{\mathit{eff}} \Delta L_k$., i.e. the value for the effective index step increment.

Figure 19A:
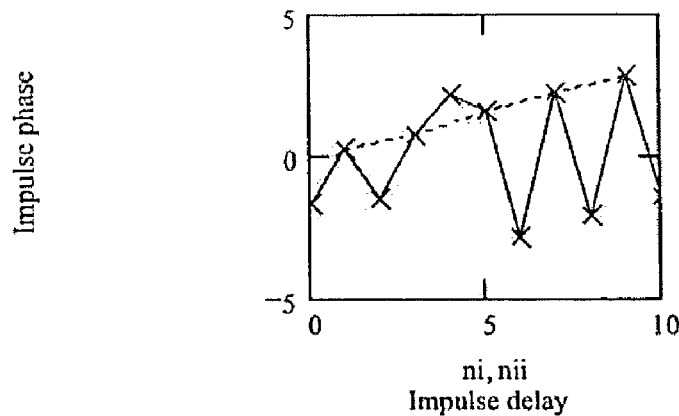
Figure 19B:
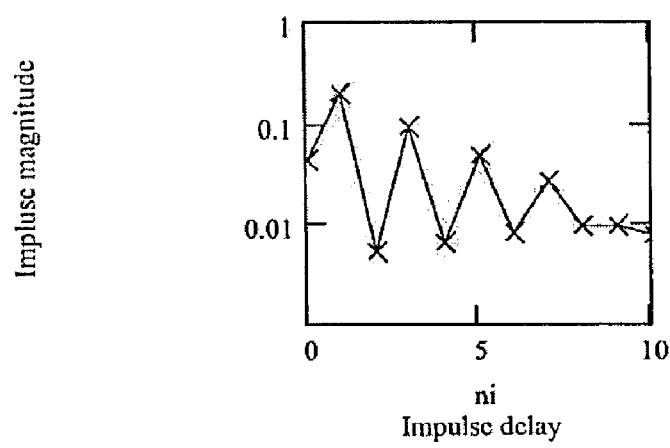
Figure 20:
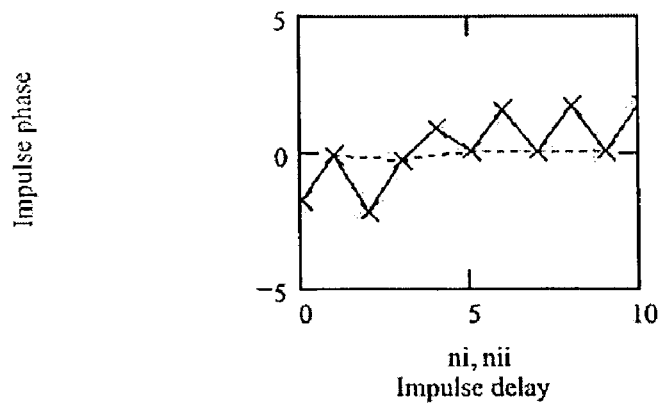
Figure 20B:
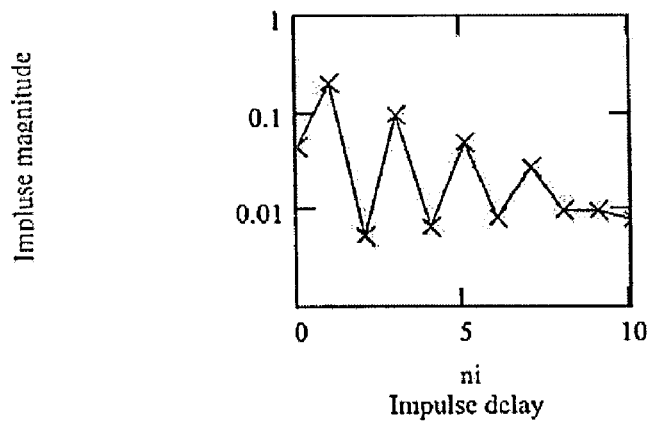

In FIG. 19a/b the phase and amplitude distribution is shown for a better approximate value of $n_{\mathit{eff}} \Delta L_k$, for which all 2π jumps has been removed. The dotted line in FIG. 19a connects the points corresponding to a non-zero impulse response. After minimising the number of 2π jumps in the phase distribution, the next step of the iterative process is to vary the $n_{\mathit{eff}} \Delta L_k$. product in order to minimise the slope of the dotted line, i.e. t achieve for the phase of the non-zero impulse response approximate equal values, for example about 0 for the most of the points. In FIG. 20a/b the phase and amplitude distribution is shown for a correct approximated value of the product $n_{\mathit{eff}} \Delta L_k$.

The IFT method according to the invention has been also applied to the transmission of the Single Coupler Ring Resonator (SCRR). It is possible, in this case, to obtain the value of the excess loss of the coupler, the coupling efficiency, the round-trip loss and the optical length ($L*n_{\mathit{eff}}$) of the RR.

CONCLUSION

The IFT method according to the invention, which could be also called as a Fourier Spectroscopy Analysis provide a new way to characterize the basic parameters of optical components like AWG, resonator, filter etc. It is possible also to apply the IFT method to any design/optical component which can be described using the Z-transformation and provides a measurement of the coefficients of those Z-transformation.

The invention claimed is:

1. A method for determining physical characteristics of an optical component, comprising:
   measuring a complex transmission of the optical component,
   determining a free spectral range of the optical components,
   determining the physical characteristics of the optical component by
   applying of a basic formula comprising an effective index step increment of the optical component to said complex transmission at least along one free spectral range, and
   varying said effective index step increment in order to get approximate results for the physical characteristics.

2. The method according to claim 1, wherein said basic formula for the optical component is derived by describing the transmission of the optical component as a complex periodic function, wherein the period of said complex periodic function is the free spectral range of the optical component, and applying an inverse Fourier transform method to the complex transmission at least along the free spectral range of the optical component or a Z-transform method to the complex transmission at least along the free spectral range of the optical component.

3. The method according to claim 2, wherein the complex periodic function comprises a Fourier series with complex coefficients and the physical characteristics are determined from the said complex coefficients, which are obtained by applying the inverse Fourier transformation to the complex transmission of the optical component.

4. The method according to claim 2, wherein the Z-transform method comprises:

applying a Z-transformation to the periodic complex function, and applying a Cauchy integral to the complex transmission of the optical component at least along the free spectral range.

5. The method according to claim 1, wherein the complex transmission is detemiined by a measurement of the transmittance and the time delay or by applying a Fourier Transform Spectroscopy.

6. The method according to claim 5, wherein the phase of the measured transmission is determined from the time delay measurement.

7. The method according to claim 1, wherein the optical component is an Arrayed Waveguide Grating and the physical characteristics are the amplitude and phase distribution of the Arrayed Waveguide Grating.

8. The method according to claim 1, wherein the optical component is a ring resonator and the physical characteristics are the magnitude and the phase of the impulse response of the ring resonator.

9. A system for determining physical characteristics of an optical component, comprising:

a measurement member configured to measure a complex transmission of the optical component; and a processor configured to perform a process for evaluating the complex transmission by performing the method of one of the claims 1 to 8.

10. The method according to claim 1, wherein the basic formula comprises $$c_i = \frac{1}{T} \int_{\sigma}^{\sigma+T} H(\alpha) \cdot \exp(-i2\pi \cdot \alpha \cdot k \cdot n_{\mathit{eff}} \cdot \Delta L_k) \cdot d\alpha$$

11. The method according to claim 10, wherein the optical component is an Arrayed Waveguide Grating and the physical characteristics are the amplitude and phase distribution of the Arrayed Waveguide Grating.

12. The method according to claim 1, wherein the basic formula comprises $$h_p = (T) \int \sigma^{\sigma+T} H(\alpha) \cdot \exp(j2\pi \cdot \alpha \cdot p \cdot \mathit{neff} \cdot L/2) \cdot d\alpha.$$

13. The method according to claim 12, wherein the optical component is a ring resonator and the physical characteristics are the magnitude and the phase of the impulse response of the ring resonator.

14. A computer-readable medium containing a program which, when executed by a processor, performs a process for determining physical characteristics of an optical component, the process comprising:

measuring a complex transmission of the optical component;

determining a free spectral range of the optical component;

determining the physical characteristics of the optical component by applying a basic formula, the basic formula comprising an effective index step inaement of the optical component to the complex transmission at least along one free spectral range; and varying the effective index step increment in order to get approximate results for the physical characteristics.

15. The computer readable medium according to claim 14, wherein said basic formula for the optical component is derived by describing the transmission of the optical component as a complex periodic function, wherein the period of said complex periodic function is the free spectral range of the optical component, and applying an inverse Fourier transform method to the complex transmission at least along the free spectral range of the optical component or a Z-transform method to the complex transmission at least along the free spectral range of the optical component.

16. The computer readable medium according to claim 15, wherein the complex periodic function comprises a Fourier series with complex coefficients and the physical characteristics are determined from the said complex coefficients, which are obtained by applying the inverse Fonder transformation to the complex transmission of the optical component.

17. The computer readable medium according to claim 15, wherein the Z-transform method comprises:

applying a Z-transformation to the periodic complex function, and applying a Cauchy integral to the complex transmission of the optical component at least along the free spectral range.

18. The computer readable medium according to claim 14, wherein the complex transmission is determined by a measurement of the transmittance and the time delay or by applying a Fourier Transfonn Spectroscopy.

19. The computer readable medium according to claim 18, wherein the phase of the measured transmission is determined from the time delay measurement, 20. The computer readable medium according to claim 14, wherein the optical component is an Arrayed Waveguide Grating and the physical characteristics are the amplitude and phase distribution of the Arrayed Waveguide Grating.

* * * * *